(12) United States Patent
Hsiao

(10) Patent No.: US 7,016,616 B2
(45) Date of Patent: Mar. 21, 2006

(54) INTEGRATED CIRCUIT RECEIVER AVAILABLE FOR INFRARED OR ULTRASONIC TRANSMISSION WITH DIGITAL FILTERING

(75) Inventor: Chun-Yang Hsiao, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 686 days.

(21) Appl. No.: 09/990,274

(22) Filed: Nov. 23, 2001

(65) Prior Publication Data

US 2002/0071344 A1   Jun. 13, 2002

(30) Foreign Application Priority Data

Dec. 5, 2000 (TW) .............................. 89221132 U

(51) Int. Cl.
*H04B 10/06* (2006.01)
*H04B 10/10* (2006.01)
*H03K 9/02* (2006.01)
*H04L 27/06* (2006.01)

(52) U.S. Cl. ........................ 398/202; 398/118; 375/316
(58) Field of Classification Search ................ 375/350, 375/229, 232
See application file for complete search history.

(56) References Cited

U.S. PATENT DOCUMENTS

| 3,793,588 A | * | 2/1974 | Gerwen et al. ............. 375/296 |
| 5,684,830 A | * | 11/1997 | Ichikawa et al. .......... 375/254 |
| 6,061,551 A | * | 5/2000 | Sorrells et al. ............ 455/118 |
| 6,064,704 A | * | 5/2000 | Liu et al. ..................... 375/350 |

\* cited by examiner

*Primary Examiner*—M. R. Sedighian
*Assistant Examiner*—David S Kim
(74) *Attorney, Agent, or Firm*—Rosenberg, Klein & Lee

(57) ABSTRACT

The present invention discloses an integrated circuit receiver available for infrared or ultrasonic transmission by use of digital filtering for demodulation of infrared or ultrasonic carrier signal. The integrated circuit receiver comprises an infrared receiver or ultrasonic transducer to receive the transmitted signal from outside and output a modulated carrier signal. The modulated carrier signal is fed to an amplifier circuit to be amplified and then outputted to a digital filter to filter out the carrier from the amplified signal, and thus a digital data signal is recovered. The filtering thereof is done by a digital filter instead of an analog one.

3 Claims, 6 Drawing Sheets

INTEGRATED CIRCUIT RECEIVER AVAILABLE FOR INFRARED OR ULTRASONIC TRANSMISSION WITH DIGITAL FILTERING

FIELD OF THE INVENTION

The present invention generally relates to an infrared or ultrasonic receiver, and more particularly, to an integrated circuit receiver available for infrared or ultrasonic transmission with digital filtering.

BACKGROUND OF THE INVENTION

Conventional infrared receiver can be typically classified into two types, one of them directly outputs the modulated or carrier signal from the infrared receiver as the output signal and thus for application it should be incorporated with an additional carrier-filtering circuitry such as an intermediate frequency (IF) filter combined with a detector to filter out the carrier component from the output signal of the infrared receiver, as shown in FIG. 1. In FIG. 1, the modulated or carrier signal from the infrared photodiode receiver front-end 10 is amplified by an amplifier 12 and then filtered by an IF filter 14, resulting in a larger distortion, a detector 16 and a waveform shaper 18 extract the rectangular wave and amplify it, and finally the data is outputted. The other type of infrared receiver is an infrared receiver module 20 as shown in FIG. 2, which comprises an amplifier and a carrier filter within the module 20 and is able to directly output a digital data signal.

Among the above two types of infrared receivers, the second one is more convenient for utilization since no additional carrier-filtering circuitry is necessary, however, it comes with higher cost, causing users to choose the first type and combine a carrier-filtering circuit by themselves.

On the other hand, for conventional receiver circuit available for both infrared and ultrasonic transmission, in addition to a built-in amplifier to amplify the carrier signal thereof, there is also included an analog filter to filter out the carrier component from the carrier signal, and the analog filter employed is constructed with resistors, capacitors, diodes and inductors, thereby the analog filter is; not suitable for integrated circuit.

However, digital filtering has been developed to demodulate signals, for instance, by Taiwan paten application no. 83213974 entitled "Improved Infrared Receiver" issued to Cheng. Cheng proposed an apparatus to do signal filtering by a digital filter to avoid the distortion and error resulting from the filtering process, thereby increasing the signal reliability and accuracy.

Nevertheless, a cheap receiver available for infrared and ultrasonic transmissions with digital filtering is not disclosed. The present invention is therefore directed to an improvement of an integrated circuit infrared and ultrasonic receiver employed with digital filtering technique.

SUMMARY OF THE INVENTION

One object of the present invention is to provide an integrated circuit receiver available for infrared or ultrasonic transmission by use of digital filtering for demodulation of the carrier signal thereof, so as to reduce the cost and enhance the stabilities thereto.

According to the present invention, an integrated circuit receiver available for infrared or ultrasonic transmission comprises an infrared receiver or an ultrasonic transducer, an amplifier and a digital filter. The infrared receiver or ultrasonic transducer accepts a transmitted signal from outside of the integrated circuit receiver and outputs a modulated carrier signal which is then amplified by the amplifier, and the amplified signal from the amplifier is transmitted to the digital filter to filter out the carrier component thereof and so as to recover a digital data signal. The integrated circuit receiver available for infrared or ultrasonic transmission disclosed herewith is not implemented with analog filter, and it is therefore suitable to be integrated within a chip.

BRIEF DESCRIPTION OF THE DRAWINGS

For a better understanding of the present invention, reference may be had to the following description of exemplary embodiments thereof, considered in conjunction with the accompanying drawings, in which.

DETAILED DESCRIPTION OF THE INVENTION

Figure 1:
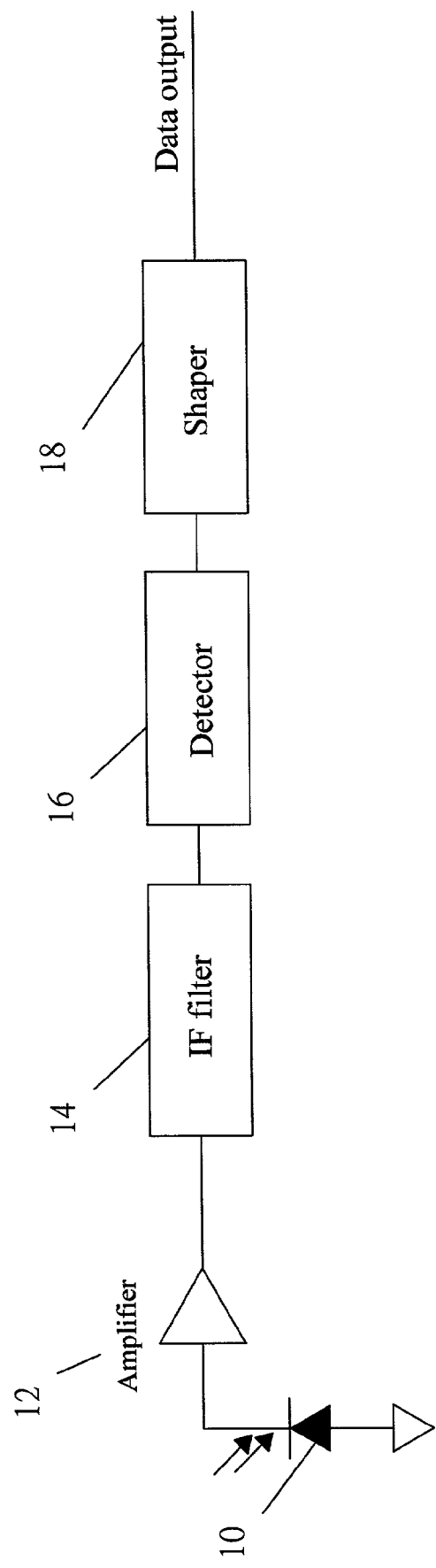
FIG. 1 is the circuit block diagram of a conventional infrared receiver.
Figure 2:
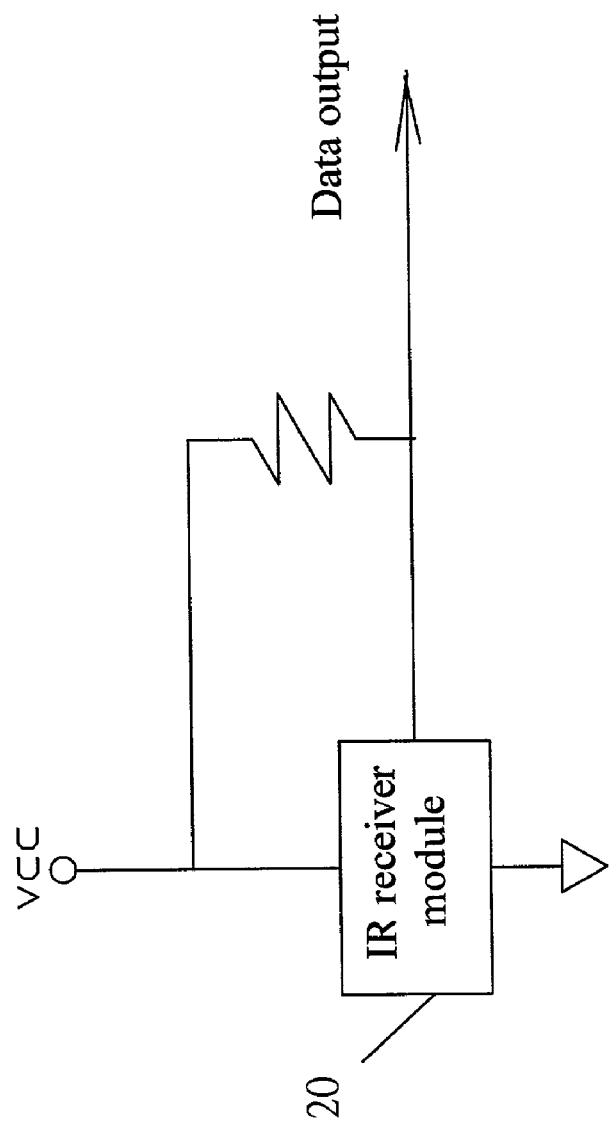
FIG. 2 is the circuit schematic of a conventional infrared receiver module.
Figure 3:
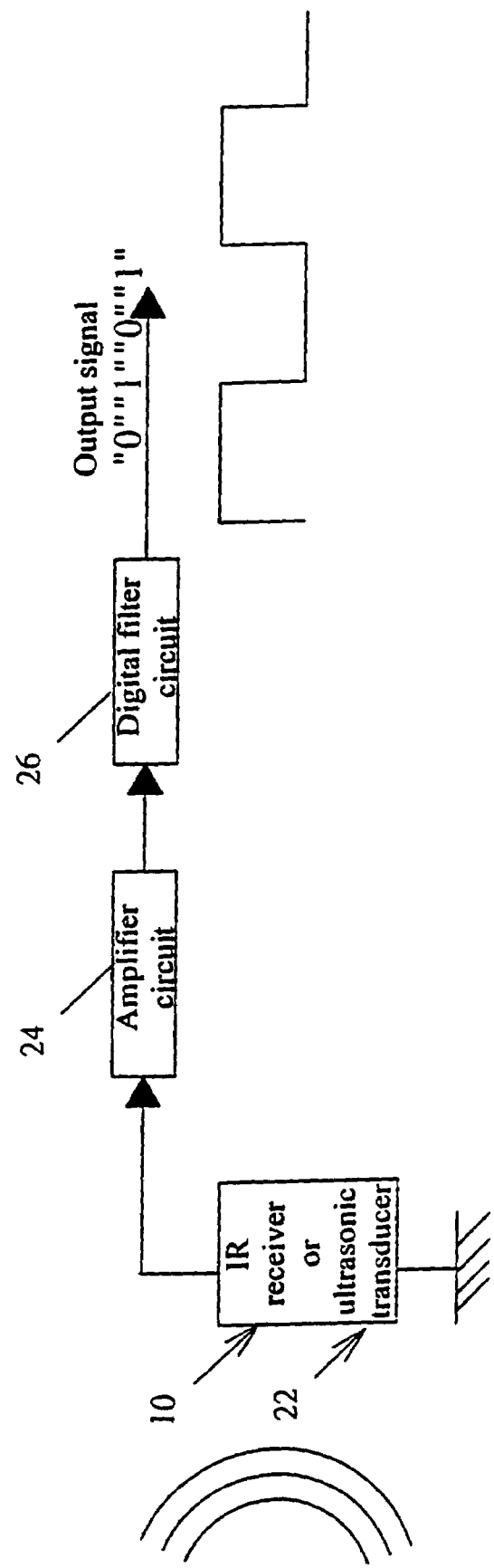
FIG. 3 is the block diagram of an embodiment according to the present invention.

The block diagram of an embodiment according to the present invention is shown in FIG. 3, in which an infrared receiver 10 or ultrasonic transducer 22 accepts a transmitted signal from outside and outputs a modulated carrier signal. The output from the infrared receiver 10 or ultrasonic transducer 22 is fed to an amplifier circuit 24, and the amplified signal thus produced by the amplifier circuit 24 is further fed to a digital filter 26 to filter out the carrier component thereof and therefore a digital data signal is recovered. When no transmitted signals outside are present, the output of the amplifier circuit 24 remains at a silent voltage.

Figure 4:
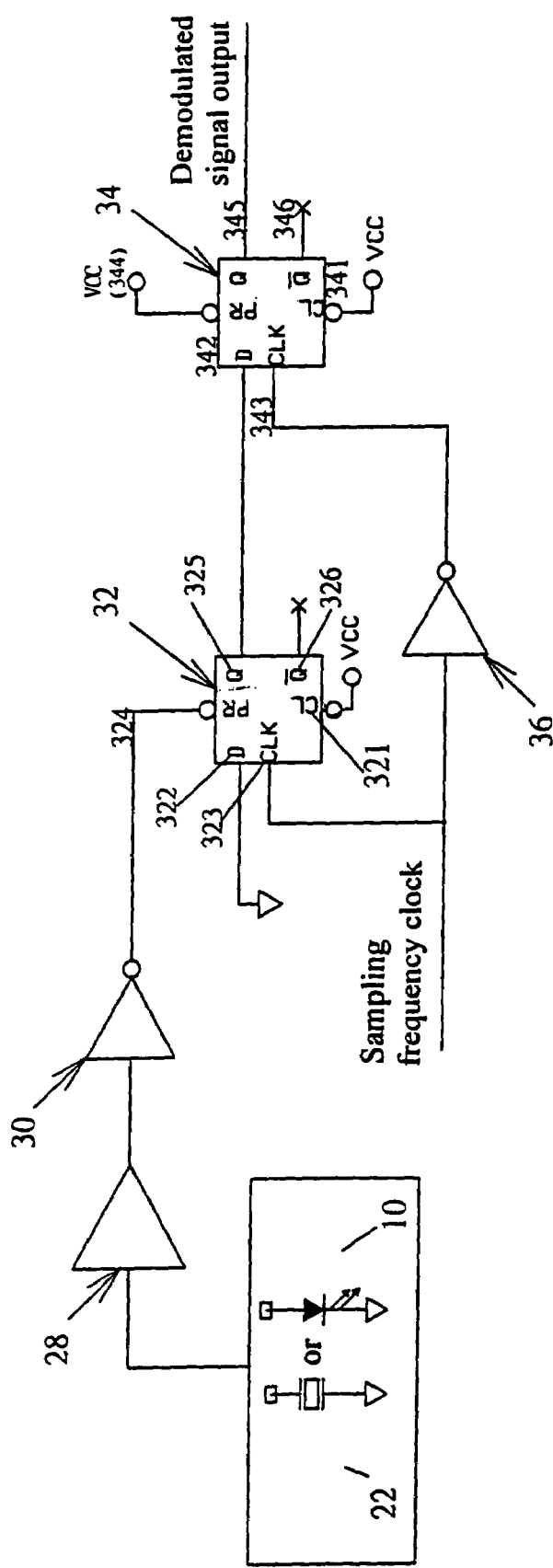
FIG. 4 is a detail circuit for the implementation of the apparatus shown in FIG. 3.

A detail circuit for implementation of the apparatus shown in FIG. 3 is further provided in FIG. 4, in which the infrared receiver 10 or ultrasonic transducer 22 accepts the transmitted signal from outside and outputs the modulated or carrier signal. The output from the infrared receiver 10 or ultrasonic transducer 22 is fed to an amplifier 28, and the output from the amplifier 28 is inverted by an inverter 30 and then fed to the PR port 324 of a first D type flip-flop 32, which has its Q port 325 connected to the D port 342 of a second D type flip-flop 34. A sampling frequency clock is connected to the clock port CLK 323 of the first D type flip-flop 32 and through an inverter 36 to the clock port CLK 343 of the second D flip-flop 34. The demodulated signal is outputted from the Q port 345 of the second D type flip-flop 34. Respective clear ports CL 321 and 341 of the D type flip-flops 32 and 34 are connected to a power supply Vcc, and the complementary Q ports/Q 326 and 346 are left floating. The D port 322 of the first D type flip-flop 32 is grounded, and the preset port PR 344 of the second D type flip-flop 34 is also connected to voltage Vcc.

Figure 5:
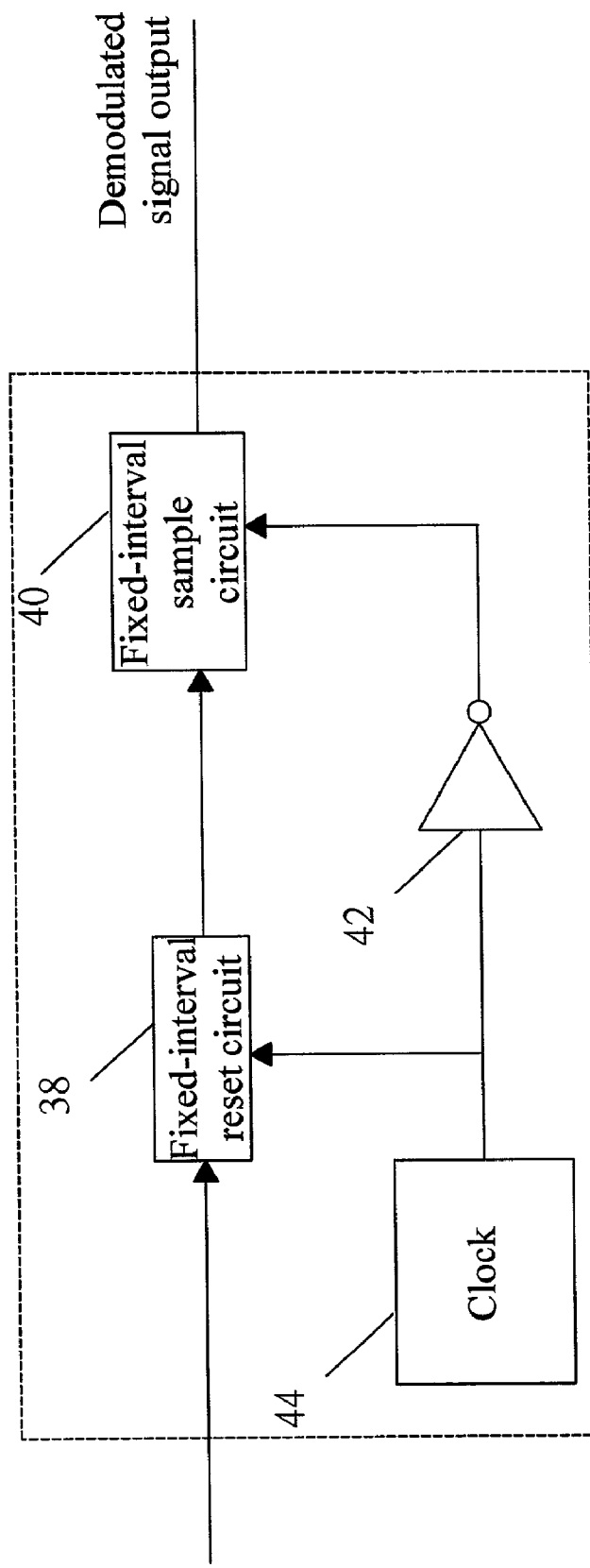
FIG. 5 is a circuit block diagram of a digital filter for the apparatus shown in FIG. 3.

FIG. 5 shows the block diagram of a digital filter, in which the digital filter 26 is fed with the amplified output signal that is amplified by the amplifier 28 with the output signal from the infrared receiver 10 or ultrasonic transducer 22. When the amplified output signal is inputted to the digital filter 26, the output of the fixed-interval reset circuit 38 within the digital filter 26 is set ON. The clock 44 is connected to a fixed-interval reset circuit 38 and is connected to a fixed-interval sample circuit 40 through an inverter 42. The fixed-interval reset circuit 38 resets its output to OFF every interval t. In the detection of an infrared or ultrasonic signal, by setting the reset period t of the fixed-interval reset circuit 38 to be greater than the period of the carrier signal for the infrared or ultrasonic transmission, a data signal will be output by the fixed-interval sample circuit 40 and the influence of the duty cycle is avoided. Thus, the data signal is recovered and demodulation is achieved.

Figure 6:
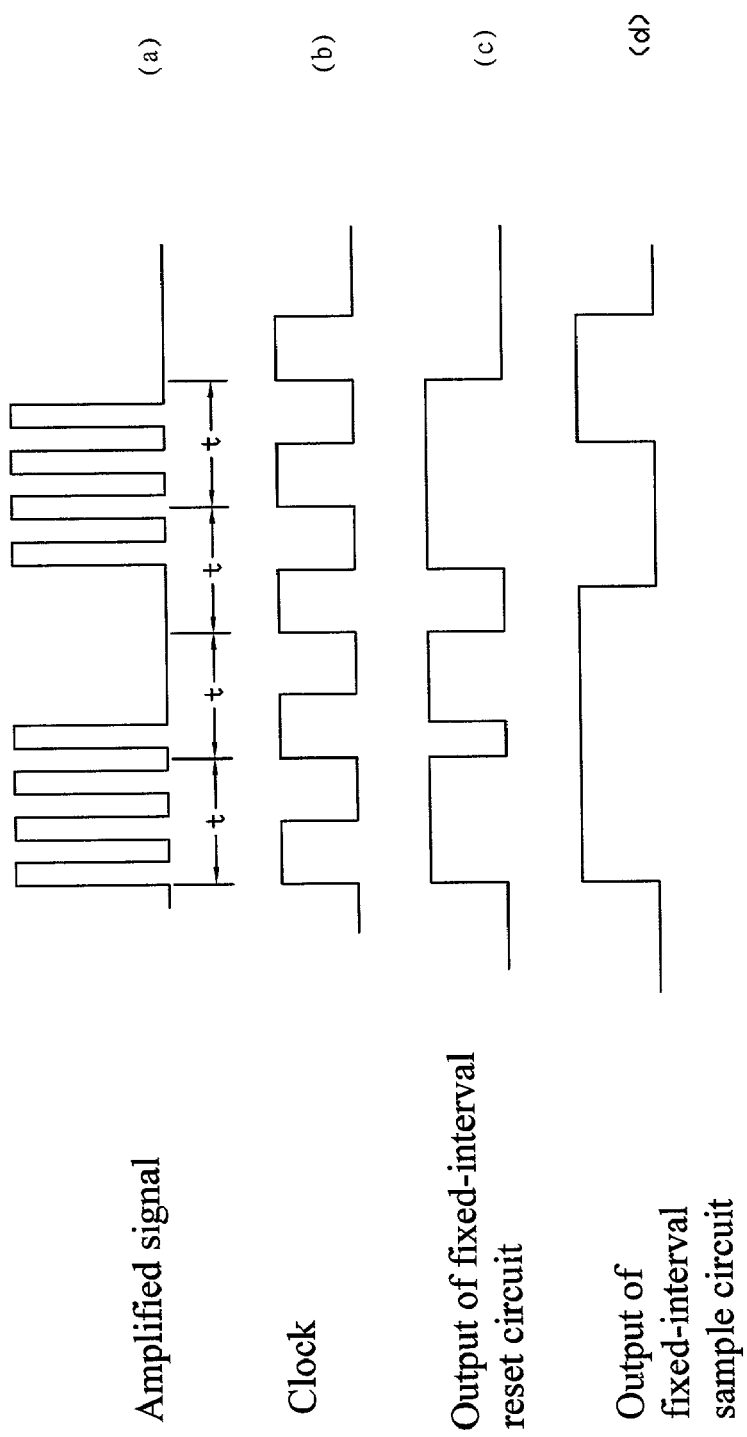
FIG. 6 shows the output waveforms from each circuit block of the apparatus shown in FIG. 3.

The output waveforms from each circuit block of the above embodiment are shown in FIG. 6. The waveform in FIG. 6(a) is the amplified output signal, i.e., the modulated or carrier signal from infrared receiver 10 or ultrasonic transducer 22 after amplified by the amplifier circuit 24. The waveform in FIG. 6(b) is the clock signal, by which the fixed-interval reset circuit 38 is trigger on its rising edge and the fixed-interval sample circuit 40 is triggered on its falling edge. The waveform in FIG. 6(c) is the output of the fixed-interval reset circuit 38. The waveform in FIG. 6(d) is the output of the fixed-interval sample circuit 40.

In this manner, the disclosed apparatus filters out the carrier component by use of digital filtering. The apparatus filters the infrared or ultrasonic carrier signal by fixed-interval sampling. Furthermore, since no analog filter is needed, it is suitable to be integrated within a chip.

From the above, it should be understood that the embodiment described, in regard to the drawings, is merely exemplary and that a person skilled in the art may make variations and modifications to the shown embodiment without departing from the spirit and scope of the present invention. All variations and modifications are intended to be included within the scope of the present invention as defined in the appended claims.

What is claimed is:

1. An integrated circuit receiver available for infrared or ultrasonic transmission with digital filtering comprising:

an infrared receiver or ultrasonic transducer for receiving a transmitted signal from outside of said integrated circuit receiver and producing a modulated carrier signal at an output thereof;

an amplifier having an input connected to said output of said infrared receiver or ultrasonic transducer for amplifying said modulated carrier signal to provide an amplified signal at an output of said amplifier; and a digital filter having an input connected to said output of said amplifier for filtering out a carrier component from said amplified signal to recover an original digital data signal, said digital filter having a sampling frequency with a period greater than a period of a frequency of said carrier component, wherein said digital filter includes:

a fixed-interval reset circuit having an input connected to said output of said amplifier for receiving said amplified signal and providing a fetched signal responsive thereto, said fixed-interval reset circuit having a reset period greater than said period of said frequency of said carrier component; and a fixed-interval sample circuit having an input connected to an output of said fixed-interval reset circuit for receiving said fetched signal and outputting said original digital data signal responsive thereto, said fixed-interval sample circuit having a sampling period equal to said reset period of said fixed-interval reset circuit.

2. An integrated circuit receiver according to claim 1, wherein said fixed-interval reset circuit and fixed-interval sample circuit are constructed with D type flip-flops.

3. An integrated circuit receiver according to claim 1, wherein said fixed-interval reset circuit and fixed-interval sample circuit are triggered on a rising edge and falling edge of a clock, respectively.

* * * * *